(12) United States Patent
Takasaka et al.

(10) Patent No.: US 6,398,144 B1
(45) Date of Patent: Jun. 4, 2002

(54) BRAKE DRIVING DEVICE OF TAPE DECK

(75) Inventors: Daisuke Takasaka; Hiroshi Hamabata, both of Osaka (JP)

(73) Assignee: Funai Electric Co., Ltd., Daito (JP)

( * ) Notice: Subject to any disclaimer, the term of this patent is extended or adjusted under 35 U.S.C. 154(b) by 33 days.

(21) Appl. No.: 09/632,848

(22) Filed: Aug. 4, 2000

(30) Foreign Application Priority Data

Aug. 4, 1999 (JP) ............................................. 11-005868

(51) Int. Cl.[7] .............................................. G03B 15/22
(52) U.S. Cl. ................................... 242/355.2; 360/96.3
(58) Field of Search ........................... 242/355.2, 355.1, 242/355, 156.2; 360/85, 95, 96.3, 96.4, 96.5; 188/166, 74

(56) References Cited

U.S. PATENT DOCUMENTS

| | | | | |
|---|---|---|---|---|
| 4,452,409 A | * | 6/1984 | Takai | |
| 4,730,792 A | * | 3/1988 | Jang | |
| 4,747,564 A | * | 5/1988 | Tsubota | |
| 5,188,311 A | * | 2/1993 | Choi | |
| 5,195,697 A | * | 3/1993 | Ikeda | |
| 5,209,427 A | * | 5/1993 | Yamaguchi et al. | |
| 5,318,241 A | * | 6/1994 | Morimoto | |
| 5,465,921 A | * | 11/1995 | Cheon | |
| 5,669,569 A | * | 9/1997 | Lee | |
| 5,716,019 A | * | 2/1998 | Ahn | |
| 6,113,021 A | * | 9/2000 | Hosokawa | |

FOREIGN PATENT DOCUMENTS

JP          6-48587         12/1994

* cited by examiner

Primary Examiner—William A. Rivera
(74) Attorney, Agent, or Firm—Crowell & Moring LLP

(57) ABSTRACT

There are provided a mode switching member (1) movable between a stop mode position in which a brake for braking rotation of a reel table is operated and a quick forward/rewind mode position; an energizing mechanism (3) for elastically energizing, when the mode switching member (1) is in the quick forward/rewind mode, the mode switching member (1) toward the stop mode position; a holding mechanism (6) for holding the mode switching member (1) in the quick forward/rewind mode position against energizing of the energizing mechanism (3) and a hold releasing mechanism (7) for releasing the holding state of the mode switching member (1) by the holding mechanism (6) according to a stop instruction for operating the brake.

8 Claims, 4 Drawing Sheets

BRAKE DRIVING DEVICE OF TAPE DECK

BACKGROUND OF THE INVENTION

The present device relates to a brake driving device of tape deck.

In case that a quickly forwarding mode or a rewinding mode is selected in a tape deck using tape-shaped information medium such as a magnetic tape, when a stop instruction of a quickly forwarding operation or a rewinding operation of the tape is issued, an operation of braking a reel table is performed timely. Therefore, a brake for braking the rotation of the reel table is provided for the tape deck.

Conventionally, as disclosed in the Unexamined Japanese Patent Application Publication No. Hei 1-220164, a brake driving device has been known, which serves as a device for momentarily changing the quickly forwarding mode or the rewinding mode to the stop mode and controls the brake by a cam.

However, in the device that controls the brake by the cam, the shape of a cam groove or the like requires high accuracy, so that there has been a problem that cost is high.

SUMMARY OF THE INVENTION

The device has been made in view of that above problem, and its object is to provide, at a low cost, a brake driving device that can change a selected operation mode, for example, a quickly forwarding mode or a rewinding mode to a stop mode by momentarily braking the reel table.

The brake driving device for tape deck according to the device includes a mode switching movable between a stop mode position in which a brake for braking rotation of a reel table is operated and another operation mode position.

Further, the brake driving device according to the device includes an energizing means for elastically energizing, when the mode switching member is in the selected operation mode position, the mode switching member toward the stop mode position; a holding means for holding the-mode switching member in the selected operation mode position against energizing of this energizing means; and a hold releasing means for releasing the holding state of the mode switching member by the holding means according to a stop instruction for operating the brake.

In this brake driving device, the selected operation mode position may be a quickly forwarding mode of tape fed out from a reel mounted on the reel table or a rewinding mode of tape rewound to the reel.

According to this brake driving device, when the mode switching member is in, for example, the quickly forwarding mode position or the rewinding mode position, in case that the hold releasing means operates by the stop instruction to release the state of the mode switching member held by the holding means, the mode switching member energized by the energizing means moves momentarily from the quickly forwarding mode position or the rewinding mode to the stop mode position, whereby the rotation of the reel table is braked by the brake.

The energizing means may include a tension spring which elastically energizes the mode switching member toward the stop mode position when the tension spring is coupled to the mode switching member and expands. Further, the energizing means may include a rack, the tension spring interposed between the rack and the mode switching member, and a pinion which interlocks with the rack and moves the rack to the position where the tension spring expands when the mode switching member is in the selected operation mode position.

Further, it is desirable that there is provided a positioning mechanism which stops in the stop mode position the switching member moved toward the stop mode position by energizing of the tension spring. According to this positioning mechanism, even if such a design that the mode switching member reaches a playing mode position or a recording mode position when it exceeds the stop mode position and moves by the energizing force of the tension spring is adopted, since the positioning mechanism positions the mode switching member in the stop mode position, such an unforeseen accident that the mode switching member moves to the play or recording mode position on the contrary to the stop instruction does not occur, which is useful to improve reliability in operation.

There may be provided a cam which rotates in synchronization with the pinion, and the holding means may include a fitting portion that is fitted in the cam and receives displacement and a stopper portion that can come in and out from the holding position where the movement of the mode switching member is obstructed by the displacement of the fitting portion.

Further, there may be provided a motor for rotating the pinion, a member for driving the stopper portion in reverse from the holding position where the movement of the mode switching member is obstructed may be provided for a rotational portion of a transmission path through which rotation of this motor is transmitted to the pinion, and this member may form the holding releasing means.

The tape decks capable of using the brake driving device according to the device include a recording tape deck which has only a function of recording information in the tape, a playing tape deck which has only a function of regenerating the information recorded in the tape, a recording and playing tape deck which has two functions of recording information in the tape and regenerating the information recorded in the tape, and the like.

The constitution and working of the brake driving device according to the device are clear from the following explanation of a mode for carrying out the device.

DETAILED DESCRIPTION OF THE PREFERRED EMBODIMENTS

Figure 1:
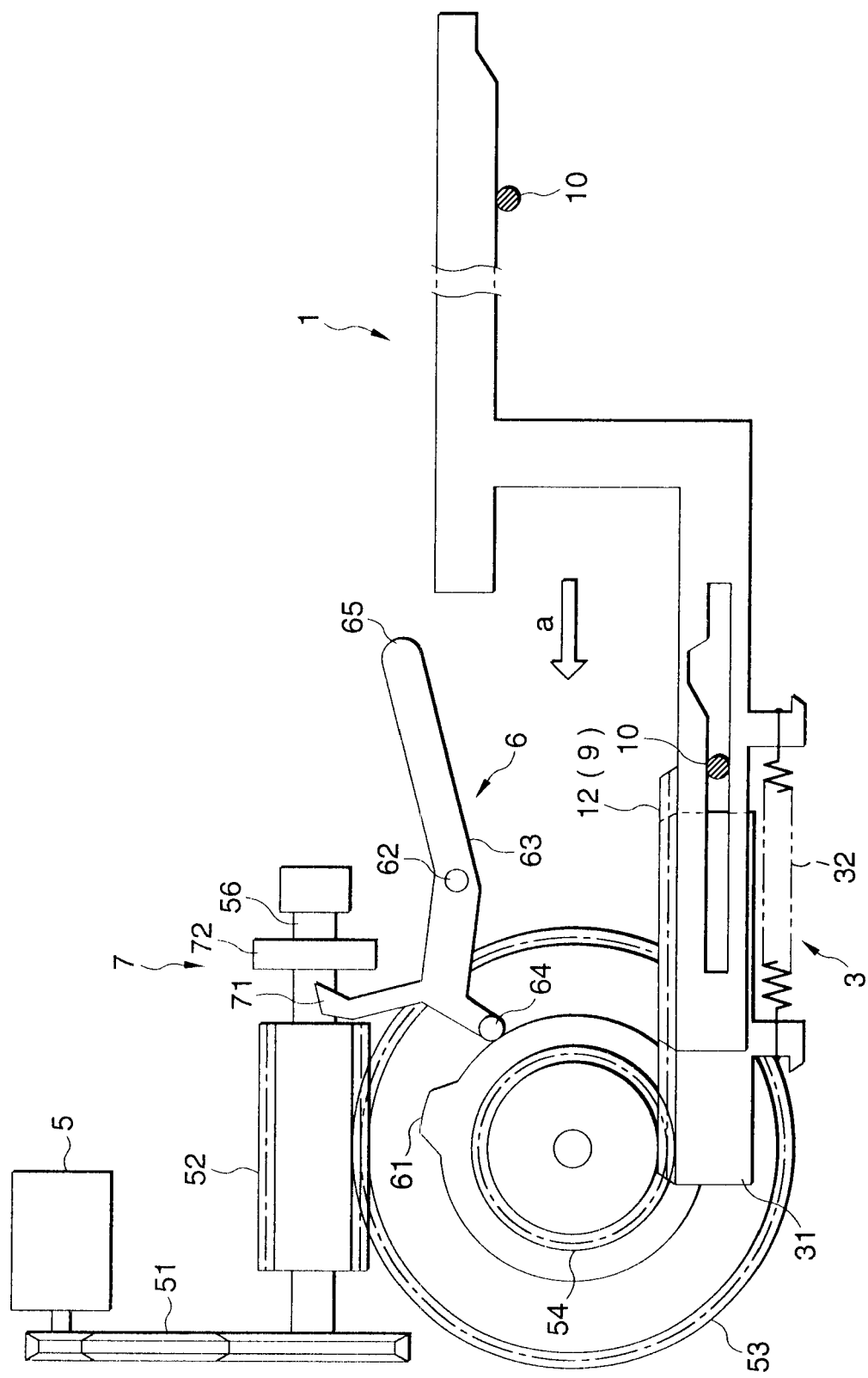
FIG. 1 is an explanatory view of a brake driving device in a state immediately before a mode switching member comes moving to a quickly forwarding mode position or a rewinding mode position.
Figure 2:
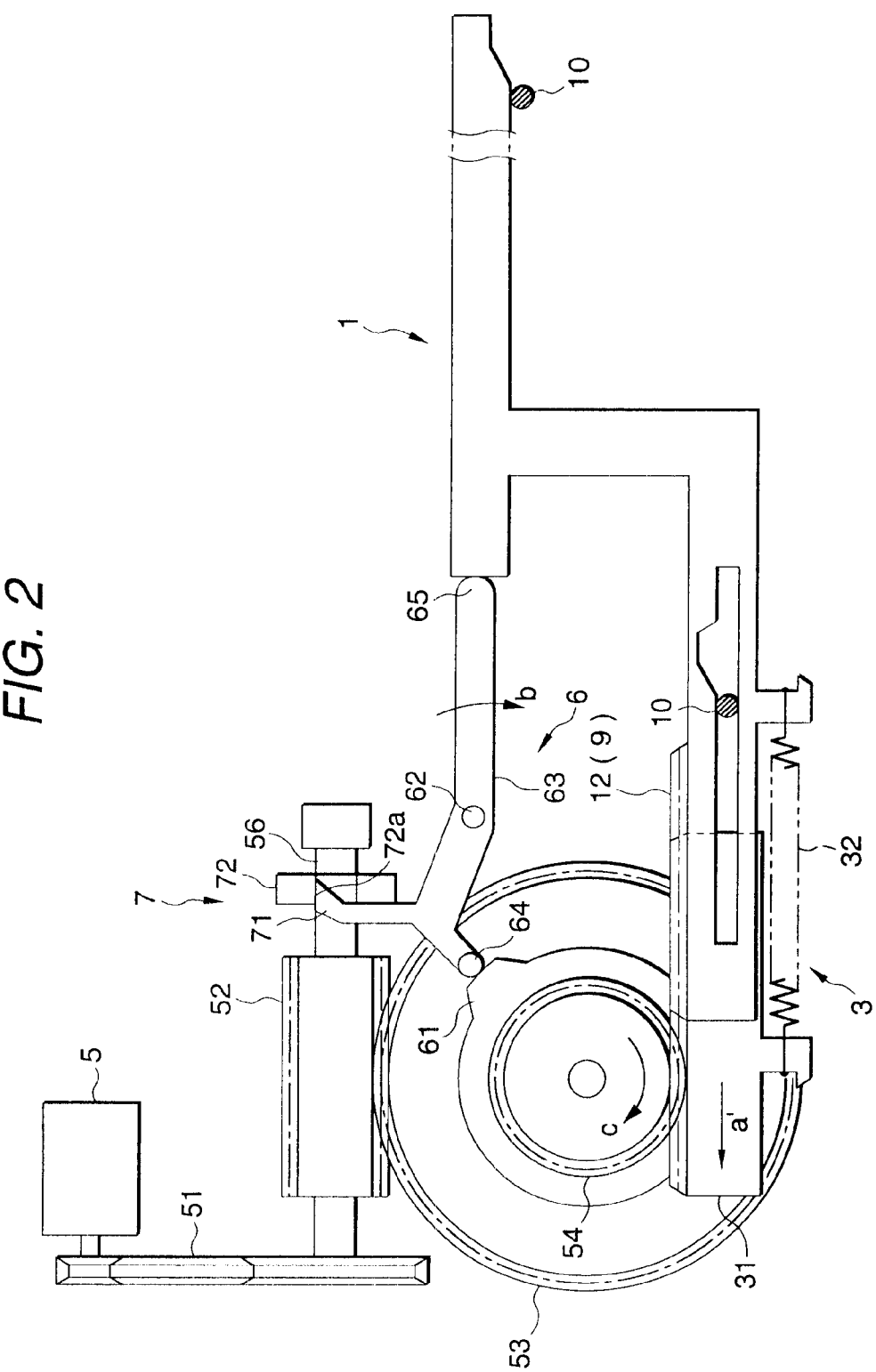
FIG. 2 is an explanatory view of the brake driving device in a state where the mode switching member is energized by an energizing means.
Figure 3:
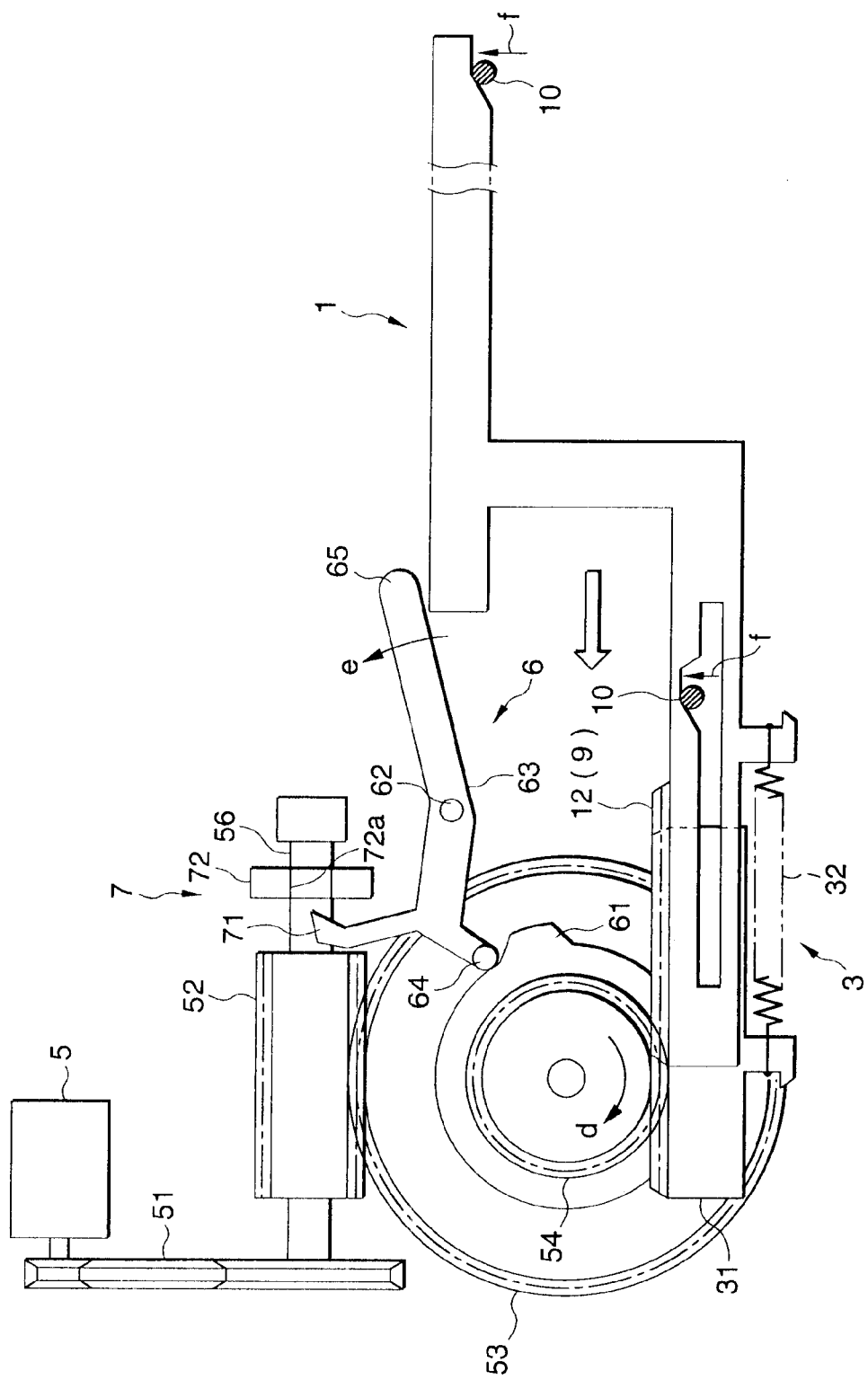
FIG. 3 is an explanatory view of the brake driving device in a state where the mode switching member has moved to a stop mode position.
Figure 4:
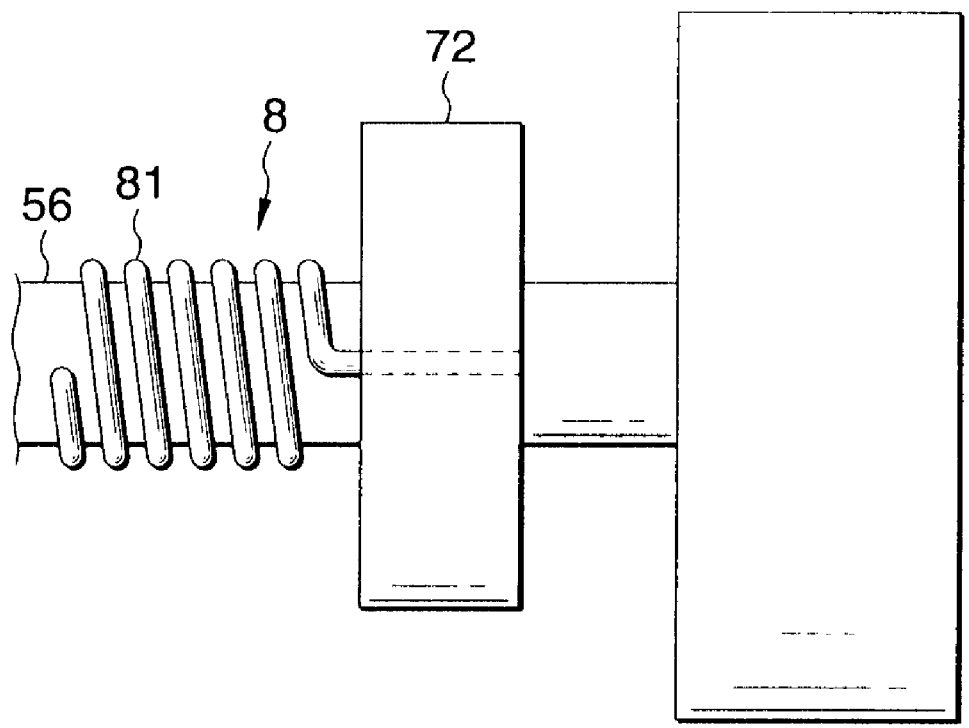
FIG. 4 is an explanatory view of a one-way-clutch.

FIG. 1 is an explanatory view of a brake driving device in a state immediately before a mode switching member 1 comes moving to a quickly forwarding mode position or a rewinding mode position, FIG. 2 is an explanatory view of the brake driving device in a state where the mode switching member 1 is energized by an energizing means 3 toward a stop mode position, FIG. 3 is an explanatory view of the brake driving device in a state where the mode switching member 1 has come moving to the stop mode position, and FIG. 4 is an explanatory view of an one-way clutch 8.

In FIGS. 1 to 3, the mode switching member 1 can move among operation mode positions such as a stop mode position where a brake (not shown) for braking rotation of a reel table (not shown) is operated, a quickly forwarding mode position where a tape is quickly forwarded, a rewinding mode position where the tape is rewound, a playing mode position, a recording mode position, and the like. The moving passage of the mode switching member 1 is formed by, for example, a linear passage.

The position of the mode switch 1 is controlled by a motor 5. Namely, rotation of the motor 5 is transmitted through a belt 51, a worm 52, and worm wheel 53 to a pinion 54. A rack 31 interlocking with the pinion 54 converts a rotational motion of the pinion 54 into a linear motion, and the movement of the rack 31 is transmitted to the mode switching member 1 through a tension coil spring 32 interposed between the rack 31 and the mode switching member 1, so that the mode switching member 1 moves on the linear passage. The rack 31 can slide along the moving direction of the mode switching member 1. When the mode switching member 1 is in other positions than the quickly forwarding mode position or the rewinding mode position, the rack 31 pulled by the tension coil spring 32 comes into contact with a stopper on the mode switching member 1 side and is positioned in the predetermined position of the mode switching member 1. Further, when the mode switching member 1 reaches a selected operation mode, the motor 5 stops in principle and the mode switching member 1 is in the selected operation mode position. When the mode switching member 1 reaches the quickly forwarding mode position, the rewinding mode position or the stop mode position, the motor 5 is controlled so as not to always stop.

FIG. 1 shows a state immediately before the mode switching member 1 reaches the quickly forwarding mode position or the rewinding mode position by moving in the direction of an arrow a. At this time, an angle cam 61 that is provided for the pinion 54 and rotates in synchronization with the pinion 54 is positioned on this side of a fitting portion 64 that is provided at one end portion of a lever 63 that can oscillate around a shaft 62, and a stopper portion 65 provided at the other end portion of the lever 63 retreats to a position where the movement of the mode switching member 1 is not obstructed. By cooperative operation of the tension coil spring 32 and the stopper on the mode switching member 1 side, the rack 31 positioned in the predetermined position of the mode switching member 1 rotates the pinion 54 and the mode switching member 1 comes moving to the position shown in FIG. 1. Thereafter, when the pinion 54 rotates by only the predetermined angle from this position and the mode switching member 1 has reached the quickly forwarding mode position or the rewinding mode position, as shown in FIG. 2, the fitting portion 64 runs on the cam 61 and fits in it, and the lever 63 rotates clockwise, that is, in the direction of an arrow b in FIG. 2, so that the stopper portion 65 protrudes in a holding position where the movement of the mode switching member 1 is obstructed. Therefore, the mode switching member 1 comes into contact with the stopper portion 65 and is positioned in the quickly forwarding mode position or the rewinding mode position. On the other, the pinion 54, after the mode switching member 1 has come into contact with the stopper portion 65, continues to rotates a little clockwise, that is, in the direction of an arrow of c. Thereafter, the pinion 54 stops accompanied with the rotation stop of the motor 5. Therefore, only the rack 31, while it is expanding the tension coil spring 32 against the energizing force of the tension coil spring, moves by the predetermined amount as shown by an arrow a' and then stops. The mode switching member 1 reaches the quickly forwarding mode position or the rewinding mode position, whereby the quickly forwarding operation or the rewinding operation of the tape is performed. Therefore, the operation that only the rack 31 moves against the energizing force of the tension coil spring 32 is performed within a very short time during the quickly forwarding operation or rewinding operation of the tape.

The lever 63 is provided with a fitting pawl 71, and a rotational shaft 56 of the worm 52 is provided with a fit-in and out member 72 in and out of which the fitting pawl 71 can fit. The fitting pawl 71, when the fit-in and out member 72 rotates in one direction, fits in a recess portion 72a of the fit-in and out member 72 to obstruct the rotation of the fit-in and out member 72. On the other, when the fit-in and out member 72 rotates in the other direction, the fitting pawl 71 operates so as to be pushed out from the recess portion 72. Further, the fit-in and out member 72 is attached to the rotational shaft 56 through the one-way clutch 8 (refer to FIG. 4). When the mode switching member 1 has reached the quickly forwarding mode position or the rewinding mode position as shown in FIG. 2, the fitting pawl 71 fits in the recess portion 72a of the fit-in and out member 72. The fit-in and out member 72, in the recess portion 72a of which, the fitting pawl 71 fits, rotates together with the rotational shaft 56 in the direction where the fitting pawl 71 is pushed out from the recess portion 72a by working of the one-way clutch 8. However, the fit-in and out member 72 slides together with the rotational shaft 56 in the direction opposite to the direction and rotates only the rotational shaft 56.

When the mode switching member 1 reaches the quickly forwarding mode position or the rewinding mode position as shown in FIG. 2 and the quickly forwarding operation or rewinding operation of the tape is performed, in case that a stop instruction (for example, stop instruction by a button pushing operation) is input to the motor 5, the motor 5 rotates a little. Hereby, the pinion 54 rotates a little clockwise, that is, in the direction of an arrow of d in FIG. 3 and sets the cam 61 free from the fitting portion 64 (At this time, the pinion 54 may rotate in the direction opposite to the direction d). Further, since the rotational shaft 56 also rotates a little at this time, the fit-in and out member 72 rotates a little in the direction where the fitting pawl 71 is pushed out from the recess portion 72a according-to this rotation of the rotational shaft 56 thereby to rotate the lever 63 counterclockwise, that is, in the direction of an arrow e in FIG. 3. Hereby, since the stopper portion 65 retreats from the holding position where the movement of the mode switching member 1 is obstructed, the mode switching member 1 energized by the tension coil spring 32 moves momentarily to a stop mode position by the energizing force of the tension coil spring. Therefore, when the mode switching member 1 moves to the stop mode position, a brake side operating portion 10 in which the brake operates by this movement of the mode switching member moves momentarily as shown by an arrow f, and the reel table is braked by the brake. In FIGS. 1 to 3, a pair of brake side operating portions 10 provided correspondingly to the respective right and left reel tables are shown.

In the figures, an interlocking tooth 12 having the same pitch as a tooth pitch of the rack 31 is formed on the mode switching member 1. When the mode switching member 1 moves momentarily to the stop mode position by the energizing force of the tension coil spring 32, the interlocking tooth 12 engages with the pinion 54. By engaging the interlocking tooth 12 with the pinion 54, the mode switching member 1 is reliably positioned in the stop mode position, and the operation in which the pinion thereafter rotates to move the mode switching member 1 to the other operation mode position is smoothly performed.

FIG. 4 shows the one-way clutch 8. This one-way clutch 8 is formed by engaging a coil spring 81 of which one end is secured to the fit-in and out member 72 with the rotational shaft in a sliding contact state. According to this one-way clutch 8, when the rotational shaft 56 rotates in a direction where the diameter of the coil spring 81 is enlarged, the fit-in and out member 72 in which the fitting pawl 71 fits as shown in FIG. 2 remains stopping and only the rotational shaft 56 rotates. When the rotational shaft 56 rotates in a direction where the diameter of the coil spring 81 is reduced, the rotation member 72 rotates together with the rotational shaft 56 and pushes out the fitting pawl 71 from the recess portion.

In the described mode, the energizing means 3 that energizes elastically the mode switching member 1 toward the stop mode position when the mode switching member 1 is in the quickly forwarding mode position or the rewinding mode position comprises the rack 31, the tension coil spring 32 interposed between the rack 31 and the mode switching member 1, and the pinion 54. Further, the holding means 6 that holds the mode switching member 1 in the quickly forwarding mode position or the rewinding mode position against the energizing force of the energizing means comprises the lever 63 including the fitting portion 64 and the stopper portion 65, and the cam 61. Further, The hold releasing means 7 for releasing the state of the mode switching member 1 held by the holding means 6 according to the stop instruction for operating the brake comprises the fitting pawl 71 and the fit-in and out member 72. Further, the positioning mechanism 9 for stopping in the stop mode position the mode switching member 1 that has moved toward the stop mode position by the energizing force of the tension coil spring 32 is formed of a tooth row 12 of the mode switching member 1.

According to the brake driving device of the present device, under the selected operation mode such as the quickly forwarding mode and the rewinding mode, the operation mode can be changed to the stop mode by momentarily braking the reel table. Therefore, a tape deck superior in the operation ability can be provided. Particularly, compared with the brake driving device described at the beginning, in which the brake is controlled by the cam, manufacturing is simplified, so that cost is reduced.

Preferably, in the brake driving device of tape deck according to the present invention, the holding means touches in contact with the mode switching member.

What is claimed is:

1. A brake driving device of tape deck comprising:
   a mode switching member movable between a stop mode position in which a brake for braking rotation of a reel table is operated and another operation mode position;
   energizing means for elastically energizing, when said mode switching member is in a selected operation mode position, said mode switching member toward the stop mode position;
   holding means for holding said mode switching member in the selected operation mode position against energizing of said energizing means; and
   hold releasing means for releasing the holding state of said mode switching member by said holding means according to a stop instruction for operating said brake;
   wherein said energizing means includes:
      tension spring which is coupled to said mode switching member and elastically energizes said mode switching member toward the stop mode position when said tension spring expands,
      a rack,
      said tension spring interposed between said rack and said mode switching member, and
      a pinion which interlocks with said rack and moves said rack to the position where said tension spring expands when said mode switching member is in the selected operation mode position.

2. The brake driving device of tape deck according to claim 1 wherein:
   the selected operation mode position is a quickly forwarding mode of a tape fed out from a reel mounted on said reel table or a rewinding mode of a tape rewound to said reel.

3. The brake driving device for tape deck according to claim 1 further comprising:
   positioning mechanism which stops in the stop mode position said switching member moved toward the stop mode position by energizing of said tension spring.

4. The brake driving device of tape deck according to claim 1, wherein
   said holding means touches in contact with said mode switching member.

5. A brake driving device of tape deck comprising:
   a mode switching member movable between a stop mode position in which a brake for braking rotation of a reel table is operated and another operation mode position;
   energizing means for elastically energizing, when said mode switching member is in a selected operation mode position, said mode switching member toward the stop mode position;
   holding means for holding said mode switching member in the selected operation mode position against energizing of said energizing means; and
   hold releasing means for releasing the holding state of said mode switching member by said holding means according to a stop instruction for operating said brake;
   wherein said energizing means includes:
      a tension spring which is coupled to said mode switching member and elastically energizes said mode switching member toward the stop mode position when said tension spring expands,
      a rack,
      said tension spring interposed between said rack and said mode switching member, and
      a pinion which interlocks with said rack and moves said rack to the position where said tension spring expands when said mode switching member is in the selected operation mode position;
   the brake driving device further comprising:
      a cam which rotates in synchronization with said pinion, wherein said holding means includes:
         a fitting portion that is fitted in said cam and receives displacement, and
         a stopper portion that can come in and out in the holding position where the movement of said mode switching member is obstructed by the displacement of the fitting portion.

6. A brake driving device of tape deck comprising:
   a mode switching member movable between a stop mode position in which a brake for braking rotation of a reel table is operated and another operation mode position;
   energizing means for elastically energizing, when said mode switching member is in a selected operation mode position, said mode switching member toward the stop mode position;

holding means for holding said mode switching member in the selected operation mode position against energizing of said energizing means; and hold releasing means for releasing the holding state of said mode switching member by said holding means according to a stop instruction for operating said brake;

wherein said energizing means includes a tension spring which is coupled to said mode switching member and elastically energizes said mode switching member toward the stop mode position when said tension spring expands;

positioning mechanism which stops in the stop mode position said switching member moved toward the stop mode position by energizing of said tension spring;

a cam which rotates via said energizing means, wherein said holding means includes:
  a fitting portion that is fitted in said cam and receives displacement, and
  a stopper portion that can come in and out in the holding position where the movement of said mode switching member is obstructed by the displacement of the fitting portion.

7. A brake driving device of tape deck comprising:

a mode switching member movable between a stop mode position in which a brake for braking rotation of a reel table is operated and another operation mode position;

energizing means for elastically energizing, when said mode switching member is in a selected operation mode position, said mode switching member toward the stop mode position;

holding means for holding said mode switching member in the selected operation mode position against energizing of said energizing means; and hold releasing means for releasing the holding state of said mode switching member by said holding means according to a stop instruction for operating said brake;

wherein said energizing means includes:
  a tension spring which is coupled to said mode switching member and elastically energizes said mode switching member toward the stop mode position when said tension spring expands,
  a rack,
  said tension spring interposed between said rack and said mode switching member, and
  a pinion which interlocks with said rack and moves said rack to the position where said tension spring expands when said mode switching member is in the selected operation mode position;
  a cam which rotates in synchronization with said pinion, wherein said holding means includes:
    a fitting portion that is fitted in said cam and receives displacement, and
    a stopper portion that can come in and out in the holding position where the movement of said mode switching member is obstructed by the displacement of the fitting portion;
  a motor for rotating said pinion, and
  a member for driving said stopper portion in reverse from the holding position where the movement of said mode switching member is obstructed, provided at a rotational portion of a transmission path through which rotation of said motor is transmitted to said pinion so as to form said hold releasing means.

8. A brake driving device of tape deck comprising:

a mode switching member movable between a stop mode position in which a brake for braking rotation of a reel table is operated and another operation mode position;

energizing means for elastically energizing, when said mode switching member is in a selected operation mode position, said mode switching member toward the stop mode position;

holding means for holding said mode switching member in the selected operation mode position against energizing of said energizing means; and hold releasing means for releasing the holding state of said mode switching member by said holding means according to a stop instruction for operating said brake;

wherein said energizing means includes a tension spring which is coupled to said mode switching member and elastically energizes said mode switching member toward the stop mode position when said tension spring expands;

positioning mechanism which stops in the stop mode position said switching member moved toward the stop mode position by energizing of said tension spring;

a cam which rotates via said energizing means, wherein said holding means includes:
  a fitting portion that is fitted in said cam and receives displacement, and
  stopper portion that can come in and out in the holding position where the movement of said mode switching member is obstructed by the displacement of the fitting portion;
  a motor for rotating said pinion, and
  a member for driving said stopper portion in reverse from the holding position where the movement of said mode switching member is obstructed, provided at a rotational portion of a transmission path through which rotation of said motor is transmitted to said pinion so as to form said hold releasing means.

* * * * *